US006849582B2

(12) United States Patent
Grainger et al.

(10) Patent No.: US 6,849,582 B2
(45) Date of Patent: Feb. 1, 2005

(54) METHOD OF OIL/GAS WELL STIMULATION

(75) Inventors: Neil Grainger, Stockton on Tees (GB); Terence Cox, Saltburn by Sea (GB); Edward George Scovell, Middlesbrough (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 10/293,616

(22) Filed: Nov. 14, 2002

(65) Prior Publication Data

US 2003/0060375 A1 Mar. 27, 2003

Related U.S. Application Data

(63) Continuation of application No. PCT/GB01/02076, filed on May 10, 2001.
(60) Provisional application No. 60/205,030, filed on May 18, 2000.

(30) Foreign Application Priority Data

May 15, 2000 (GB) .............................. 0011573

(51) Int. Cl.$^7$ .............................. E21B 43/26; C09K 3/00
(52) U.S. Cl. ..................... 507/262; 507/263; 507/267; 507/265; 507/922; 507/923; 507/933; 166/308.2; 166/307
(58) Field of Search ................................ 507/136, 137, 507/262, 263, 265, 267, 922, 923, 933; 166/307, 308.2, 308

(56) References Cited

U.S. PATENT DOCUMENTS

| 3,083,158 | A | * | 3/1963 | Markham | 507/203 |
| 3,415,320 | A | * | 12/1968 | Young | 166/294 |
| 3,810,836 | A | * | 5/1974 | Norton | 507/116 |
| 4,556,495 | A | * | 12/1985 | Shaw | 507/263 |
| 4,664,820 | A | * | 5/1987 | Magauran et al. | 508/136 |
| 4,738,789 | A | * | 4/1988 | Jones | 507/254 |
| 4,781,207 | A | * | 11/1988 | Balzer | 137/13 |
| 4,844,756 | A | | 7/1989 | Forsberg | |
| 5,633,220 | A | | 5/1997 | Cawiezel et al. | |
| 5,710,111 | A | * | 1/1998 | Van Slyke | 507/137 |
| 5,925,182 | A | * | 7/1999 | Patel et al. | 106/266 |
| 2003/0130132 | A1 | * | 7/2003 | Grainger et al. | 507/100 |

FOREIGN PATENT DOCUMENTS

WO    WO 93/23491    11/1993

* cited by examiner

*Primary Examiner*—Philip C. Tucker
(74) *Attorney, Agent, or Firm*—Mayer Brown Rowe & Maw LLP

(57) ABSTRACT

Stimulation, particularly fracturing or acidising, of hydrocarbon wells having bores leading to hydrocarbon bearing uses a fluid including a continuous phase of or including a compound of the formula (1): $(R^2)_p$—Ph—$(CH_2)_m$—COO—$(AO)_n$—$R^1$ where $R^1$, AO, n, m, Ph, $R^2$ and p having defined meanings and particularly where the esters are alkyl or alkenyl benzoate esters. These esters are beneficial by having a range of viscosities, especially extending to low viscosities, and attractive toxicological and environmental profiles for use in well stimulation.

31 Claims, No Drawings

METHOD OF OIL/GAS WELL STIMULATION

CROSS REFERENCE TO RELATED APPLICATIONS

This application is a continuation of International Application No. PCT/GB01/02076, filed May 10, 2001, and further claims benefit from U.S. Provisional Application No. 60/205,030, filed May 18, 2000. These applications, in their entirety, are incorporated herein by reference.

The present invention relates to the stimulation of oil and gas wells, particularly acidising and fracturing processes, and in particular to such processes in which the well fluid is based on hydrocarbyl, especially alkyl or alkenyl, esters of certain aromatic carboxylic acids, to invert fluids particularly acidising and fracturing fluids, including such esters.

In hydrocarbon recovery particularly oil and gas well stimulation e.g. acidising and fracturing, operations, it is common practice to fill the well bore with liquid. In many cases this liquid is an aqueous liquid having dissolved salts and/or suspended weighting solids to give a liquid density such that the hydrostatic pressure at the base of the bore equals, or exceeds the pressure in the oil or gas bearing formation at that point. However, with some oil and gas formations, the presence of aqueous liquid is desirably avoided e.g. because rock formations in the well bore, commonly but not necessarily in the production zone of the well, adversely react with water e.g. by absorbing water and swelling or by dissolving in the aqueous well fluid. In such situations it is common to use non-aqueous liquids es the well fluids for such operations.

This invention is directed to the use of certain aromatic carboxylic acid esters, particularly hydrocarbyl, desirably alkyl or alkenyl, esters, having valuable properties, in oil or gas well stimulation processes or as components in stimulation fluids. In particular these esters have a range of viscosities, especially extending to low viscosities, and toxicological and environmental profiles that can make them potentially very attractive as components of oil phase fluids for use in the stimulation of oil and/or gas wells.

Accordingly, the present invention provides a method of stimulating an oil or gas well which includes introducing into the well a fluid which has a continuous phase including at least one compound of the general formula (I):

$$(R^2)_p\text{—Ph—}(CH_2)_m\text{—COO—}(AO)_n\text{—}R^1 \quad (I)$$

where $R^1$ is a $C_1$ to $C_{20}$ hydrocarbyl group, particularly a $C_3$ to $C_{18}$ alkyl or alkenyl group;

AO is an alkyleneoxy group, particularly an ethyleneoxy or a propyleneoxy group, and may vary along the (poly)alkyleneoxy chain;

n 0 or from 1 to 100, desirably 0;

m is 0, 1 or 2, desirably 0; and

Ph is a phenyl group, which may be substituted with groups $(R^2)_p$; where each $R^2$ is independently a $C_1$ to $C_4$ alkyl or alkoxy group; and p is 0, 1 or 2, desirably 0; and thereafter carrying out well stimulation operations.

The well stimulation operations are desirably acidisation end/or fracturing of rock forming the production zone of the well. Accordingly the invention includes:

a method of acidisation of a hydrocarbon particularly an oil or gas, well which includes introducing a acidisation fluid, which is an emulsion of an aqueous solution of at least one acidising material in a continuous phase of an ester containing liquid including at least one compound of the formula (I) as defined above, to a production zone of the well and into contact with a production formation whereby to acidise the formation;

a method of fracturing of a hydrocarbon, particularly an oil or gas, well in which a fracturing fluid, which is an emulsion of an aqueous acid phase in a continuous phase of an ester containing liquid including at least one compound of the formula (I) as defined above, the fluid additionally including a dispersion of solid proppant particles, is introduced into a production zone of the well and applying pressure to the fluid so as to subject the production zone to hydraulic fracturing;

an acidisation fluid which is an emulsion of an aqueous solution of at least one acidising material in a continuous non-aqueous phase including at least on compound of the formula (I) as defined above; and a fracturing fluid which is an emulsion of an aqueous medium in a continuous non-aqueous phase including at least on compound of the formula (I) as defined above, the fluid additionally including a dispersion of solid proppant particles.

In the compound of the formula (1) used in the invention $R^1$ is desirably an alicylcic group, and particularly can be an alkyl or alkenyl group. Alkyl groups have the advantage that they are more stable, particularly to oxidation, than alkenyl groups, but alkenyl esters generally remain fluid at lower temperatures than alkyl esters, especially for longer chain materials. Desirably, an alkenyl group includes only a single double bond as multiple unsaturation generally gives poor stability. $R^1$ can be a relatively short chain e.g. a $C_3$ to $C_6$, alkyl group, and is desirably branched e.g. it is an iso-propyl (prop-2-yl), sec-butyl (but-2-yl), iso-butyl (2-methyl-prop1-yl) and/or tert-butyl group, to reduce the ease with which the ester can be hydrolysed. Such esters with secondary alcohols are particularly useful and $R^1$ is thus especially a $C_3$ to $C_5$ secondary alkyl group and very desirably an isopropyl group. A benefit of such short chain esters is that they have low viscosity. Longer chain esters generally have somewhat higher viscosites, but may also be used, particularly in mixed systems (see further below) and, thus, $R^1$ can be a $C_6$ to $C_{20}$, particularly a $C_8$ to $C_{18}$ alkyl or alkenyl group which may be straight chain or branched e.g. as in 2-ethylhexyl or iso-nonyl or branched chain $C_{18}$ alkyl as in so-called iso-stearyl (actually a mixture of mainly branched $C_{14}$ to $C_{22}$ alkyl with an average chain length close to $C_{18}$). A particular unsaturated longer chain group is oleyl. Where longer chain length groups are used, particularly longer than $C_{12}$, it is desirable that they include branching and/or unsaturation as these promote liquid esters where straight chain saturated ester compounds may be solid and thus more difficult to use.

Although the carboxylic acid used in the ester can be a dihydrocinnamic acid or a phenylacetic acid, it is very desirably a benzoic add i.e. desirably m is 0. Similarly, although the phenyl ring of the acid may be substituted, it is desirable that it is unsubstituted i.e. desirably p is 0. The esters used in the invention may include a (poly)alkyleneoxy chain, $(AO)_n$ in formula (I), between the carboxyl group and the group $R^1$. When present the (poly)alkyleneoxy chain is desirably a (poly)ethyleneoxy, a (poly)propyleneoxy chain or a chain including both ethyleneoxy and propyleneoxy residues. Generally, It is desirable not to include such a chain in the ester i.e. desirably n is 0.

Among the esters useful in this invention is isopropyl benzoate which has a combination of properties that contribute to its usefulness: it has a wide liquid range (BP ca 219° C. and pour point <−60° C.); it is classified as non-flammable (flash point ca 99° C.) and under normal use conditions it has a low vapour pressure; it has a density similar to that of water (1.008 kg.l$^{-1}$ at 25° C.); and a low viscosity (2.32 cSt at 25° C.; measured by the U tube method, equivalent to 2.34 mPa.s).

To provide a balance of properties e.g. to have a fluid with a particular viscosity, mixed esters, having a variety of groups $R^1$, or blends of compounds of the formula (I), may be advantageous. Such mixed esters of blends can have the additional benefit that they are more liquid than pure, especially linear saturated compounds of similar overall $R^1$ carbon number. Particular mixed esters of low to moderate viscosity are those including esters having a relatively large group $R^1$ e.g. e.g. iso-stearyl or oleyl, with esters having a relatively small group $R^1$ e.g. isopropyl.

The fluid used in this invention can be wholly of one or more compounds of the formula (I), or it may contain other components used in admixture. Although aromatic hydrocarbons can be included it is unlikely that they will be used as a major component of any such mixed carrier fluid, because of their adverse environmental impact. Mixtures with non-aromatic hydrocarbon liquids e.g. paraffinic fluids may be used, but paraffins are relatively non-biodegradable so will generally not be preferred. Mixtures of compounds of the formula (I) with fluid esters such as fatty acid esters e.g. triglycerides or $C_1$ to $C_{20}$ monocarboxylic fatty acid $C_1$ to $C_{20}$ alkyl or alkenyl esters, can be used with advantage. In particular, as the monocarboxylic fatty acid esters often have moderate viscosities e.g. isopropyl oleate has a viscosity of ca 5.3 cSt at 40° C., the use of combinations of such esters with esters of the formula (I), particularly where $R^1$ is a $C_1$ to $C_6$, more particularly a $C_3$ to $C_5$ branched chain alkyl group and especially where the ester is or includes isopropyl benzoate, can give mixtures with low viscosity.

When mixtures are used, compounds of the formula (I) will typically be present in at least 10%, usually at least 25%, more usually at least 40%, desirably at least 50%, by weight of the total fluid used. When present, other solvent components will desirably be used at level typically of from 1 to 90, usually 1 to 75%, more desirably 2 to 60, and particularly 5 to 50% by weight of the total carrier fluid used. Relatively low proportions of esters of the formula (I) can be usefully used to reduce the viscosity of conventional non-aqueous, especially organic ester, fluids.

The compounds of the formula (I) are particularly useful as, or as components of, fluids for use in oil or gas well stimulation. Oil and gas wells may initially flow sluggishly, or after producing at a satisfactory rate over a period of time, then flow sluggishly. Such wells are often subjected to stimulation treatment to increase the flow of oil and/or gas particularly by acidisation and/or fracturing, particularly hydraulic fracturing.

Acidisation typically involves injecting into the production zone of an oil or gas well an acidic fluid including acidic materials such as hydrochloric acid, typically aqueous HCl at a concentration usually from 2 to 30% by weight (based on the total weight of the acidising fluid), mud acid, a mixture of hydrochloric and hydrofluoric acids, typically in aqueous solution at a concentration usually from 2 to 30% by weight and a weight ratio of HCl to HF typically about 5:1, or, particularly if slower reaction is desired, "organic acids", a mixture of acetic and formic acids, typically in aqueous solution at a concentration usually from 1 to 40% by weight and a weight ratio of acetic to formic typically about 1:2. By applying suitable pressure, usually mainly provided by hydrostatic pressure, the acidisation fluid is forced into the production rock around the well and dissolves acid soluble materials from the production rock. Subsequently the acidisation fluid is removed from the production rock by reducing the pressure and is pumped out of the well. Where water sensitive formations are treated, it is desirable to provide the acidisation materials as an emulsion in a non-aqueous base fluid. Accordingly this invention includes an oil or gas well acidisation fluid which is an emulsion of an aqueous solution of at least one acidising material in a continuous non-aqueous phase including at least on compound of the formula (I) as defined above and further includes a method of stimulating an oil or gas well by introducing an acidisation fluid into a production zone of the well in which the well fluid used is an emulsion of an aqueous solution of at least one acidising material in a continuous non-aqueous phase including at least on compound of the formula (I) as defined above.

Well fluids used for acidising treatments typically include other materials for example:

acid corrosion inhibitors—as the acids used in acidisation are highly corrosive towards metals, particularly having a strong tendency to pitting metal surfaces, corrosion inhibitors such as propargyl alcohol, amines, thio-compounds, are often included, typically at levels of from 1 to 4% by weight of the acidising fluid, to reduce the rate of corrosion of metal, particularly steel, equipment such as pipes, tubes and surface equipment.

surfactants—are often included in acid sing fluids to reduce the interfacial tension and thereby aid acid penetration, particularly of smaller capillaries, within the reservoir rock. Typically such surfactants are non-ionic surfactants such as alcohol alkoxylates and anionic surfactants such as sulphonates or sulphonic acids such as dodecyl benzene sulphonic acid, and are used typically at levels of from 0.1 to 1% by weight of the acidising fluid acid retarders—when acidisation materials are injected into the rock formation there is a tendency for it to react mainly in the immediate vicinity in the well bore, and organic acids, particularly acetic and/or formic acids, can be mixed with the main acidising materials such as HCl, to slow reaction such that the formation away from the well bore is also effectively treated. They are used typically at levels of from 0.1 to 1% by weight of the acidising fluid demulsifiers—in acidisation treatments of oil and gas welts, the unspent acidic materials and the reaction products of acidisation are circulated out of the well. These materials, together with other system components such as corrosion inhibitors, tend to give rise to water in oil emulsions and to prevent stable emulsions forming, demulsifiers are usually included in the acidisation fluid. Suitable demulsifiers are generally blends of cationic surfactants such as quaternary ammonium surfactants with non-ionic surfactants such as alcohol alkoxylates typically at levels of from 0.1 to 1% by weight of the acidising fluid and weight ratios of cationic to non-ionic surfactant of from 5:1 to 1:1. A further benefit of including demulsifiers is that they act as anti-sludge agents.

diverting agents—heterogeneous or layered formations have different permeability zones and during acidisation, the acidic materials penetrate further in more permeable strata. To acidise a formation uniformly, diverting agents such as wax balls, benzoic acid crystals and rock salt, typically having an average particle size of from 1.5 to 6.5 mm, are introduced to reduce the rate of flow of acidising material into the more permeable strata and effectively to divert acid to less permeable strata. When oil flow (re)

starts the diverting agents are dissolved in the oil and thus removed. Amounts used are typically in the range 6 to 12% w/v of the acidising fluid.

clay stabilisers—some oil and gas reservoirs, particularly sandstone reservoirs, contain varying amounts of clays, which are usually water sensitive and disperse when contacted by aqueous solutions. The dispersed fines can choke the throats of the sand grains and reduce permeability of the formation. Clay stabilising agents such as polyquaternary amines and quaternary surfactants can be introduced to inhibit mobilisation of clay. The amount of clay stabiliser used is typically from 0.1 to 5% by weight of the acidising fluid.

The pressure gradient in a flowing (oil) well is generally broadly proportional to the logarithm of the distance from the well bore, so that during production the major pressure drops round the welt bore and in tight or low permeable formations the flow of oil or gas can be or become very sluggish.

Increasing the permeability of the production formation around the well bore can increase the rate of production very substantially. Such increases in permeability of the rock formation can be achieved by fracturing the formation. In hydraulic fracturing a viscous fluid, usually based on water and typically including fluid loss chemicals (similar to those described above in relation to acidising) and propping agents, typically finely divided inert solid particles, are pumped into the well to generate in the formation a pressure above the fracturing pressure of the formation. The fracturing fluid can be either water or oil based (e.g. kerosene, a gas oil, diesel oil, or the like). The following chemicals are used for hydraulic fracturing:

viscosifiers—are used to increase viscosity of the fracturing fluid. Examples useful in oil based fracturing fluids include non-ionic resins such as hydrocarbon resins. Other viscosity modifiers include phosphate esters which can be used as gelling agents in oil based fluids and polysaccaride derivatives with low residue which can be used as gelling agents for low temperature jobs. Viscosifiers such as guar gum and xanthan can be used to give particular rheological properties if desired. The amount of viscosifier used is typically from 0.1 to 1% by weight of the fracturing fluid.

propping agents (proppants)—during hydraulic fracturing, fractures are created, and these tend to close due to overburden pressure when the fracturing pressure is dissipated. To prevent this proppants are added to the fracturing fluid. Typical proppants are inert finely divided solid materials such as silicon dioxide, silica sand, hardened glass, aluminium oxide and/or zirconium oxide, usually having an average particle size of from 0.5 to 2 mm. The amount of proppant used is typically in the range 12 to 120% w/v of the fracturing fluid.

friction reducers—certain high molecular weight linear polymers are used as friction reducers to reduce the pressure drop in the tubing while pumping fracturing fluid at very high rate (e.g. polyisobutylene, polyisobutyl methacrylate). The amount of friction reducer used is typically from 0.1 to 1% by weight of the fracturing fluid.

surfactants—non-ionic surfactants such as alcohol alkoxylates and anionic surfactants such as sulphonates or sulphonic acids such as dodecyl benzene sulphonic acid, are used to lower surface tension and improve well cleanup. The amount of surfactant used is typically from 0.1 to 1% by weight of the fracturing fluid.

One approach to overcome the use of costly oil in a water external emulsion for hydraulic fracturing, acidising and other well treatment applications has been to use an oil external phase or water In oil emulsion (also known as 'invert' emulsions). Such invert emulsions generally include from about 10 to 30% by volume of oil (as compared with the 50 to 80% oil typical in on in water emulsions. However, conventionally a major disadvantage of invert emulsions which severely limits their use in well stimulation is that they have very high viscosities (as compared with oil in water emulsions) resulting in high frictional resistance to flow down the well tubulars. As is described above, esters of the formula (I) e.g. isopropyl benzoate, can have very low viscosities and thus potentially overcome this difficulty of invert emulsions.

Other additives can be included in the fluids of the invention in accordance with common practice. Examples of such additives include fluid loss agents particularly such as synthetic polymers such as polyacrylamides, polyacrylates, polyamides and similar polymers (some of which can also function as viscosity improving agents); corrosion inhibitors; scale inhibitors oxygen scavengers; and other similar additive materials.

To readily maintain a balancing pressure in the production formation during stimulation operations, it will usually be desirable to have an overlying layer of a weighted well fluid to maintain adequate pressure at the production zone of the well e.g. to reduce the extent to which the oil and/or gas enters the well bore during completion or workover operations. These fluids can be oil based and such fluids and their use in drilling, completion and workover operations are described in co-pending UK patent application No 0011584.0, filed on 15th May 2000 (applicant's reference UQI 50890). The use of such fluids in layers above the stimulation fluids, particularly acidisation or fracturing fluids of and used in this invention is within this invention which thus includes stimulation methods in which the overlying fluid is a fluid which is an emulsion of an aqueous phase including dissolved salts in a continuous phase of an ester containing liquid including at least one compound of the formula (I) as defined above, the fluid further including a dispersion of weighting solids.

The following Examples illustrate the invention. All parts and percentages are by weight unless otherwise specified.

Materials

Oil 1 iso-propyl benzoate
Oil 2 ethyl benzoate
Oil 3 2-ethylhexyl benzoate
Oil 4 nonyl benzoate
Oil 5 iso-stearyl benzoate (see description above)
Emul1 Hypermer B261: water in oil emulsifier co(polyester polyether) surfactant ex Uniqema
water demineralised water
brine synthetic sea water (to British Standards 3900 and 2001)

EXAMPLE 1

An invert emulsion fracturing fluid was made by emulsifying brine in Oil1 and then dispersing a proppant in the emulsion. An invert emulsion fluid was made up by mixing 27 parts by weight Oil1 and 3 parts by weight Emul1 in a Hamilton beach blender under high shear. 70 parts by weight of brine was then added dropwise to the oil/emulsifier blend under high shear mixing (using a Sliverson mixer) form a water in oil emulsion. The emulsion temperature was maintained below 55° C. using a (cold) water bath around the mixing vessel. Mixing was continued for 15 minutes after complete addition of the aqueous phase, 100 parts by weight silica sand having a minimum particle size of 100 $\mu$m and an average particle size of about 300 μm, was mixed into the emulsion to act as a proppant. The dispersion remained stable after storage at 50° C. for 24 hours. A comparative dispersion was made up by the method described above but using diesel oil as the oil phase and some sand dropped out of suspension after storage at 50° C. for 24 hours.

EXAMPLE 2

An invert emulsion acidising fluid was made up by the emulsification method described in Example 1, but using 70 parts by weight 15% w/v aqueous hydrochloric acid as the aqueous phase (and omitting the proppant).

EXAMPLE 3

Further invert emulsion fracturing fluids were made up as described in Example 1, but using Oil 2, Oil 3, Oil 4, Oil 5 and Oil 6 rather than the Oil 1 used in Example 1 using a similar proppant as described in Example 1. The stability of the propppant dispersion in these emulsion fracturing fluids (the emulsions themselves remaining stable) was assessed under storage at ambient temperature and 50° C. for 1 day, and the results are reported in the table below.

| Ex No | Oil | Suspension stability | |
|---|---|---|---|
| | | ambient | 50° C. |
| 3.1 | Oil 2 | good | good |
| 3.2 | Oil 3 | good | moderate |
| 3.3 | Oil 4 | good | moderate |
| 3.4 | Oil 5 | good | moderate | good = proppant remains suspended; moderate = some signs of proppant drop out observed

EXAMPLE 4

Further invert emulsion acidising fluids were made up as described in Example 2, but using Oil 2, Oil 3, Oil 4 and Oil 5 rather than the Oil 1 used in Example 2. The stability of the acidising fluids was assessed after 1 hour at ambient and 50° C. also after overnight storage at 50° C. The results are set out in the Table below.

| Ex No | Oil | Stability | | |
|---|---|---|---|---|
| | | 1 hour amb | 1 hour 50° C. | 18 hours 50° C. |
| 4.1 | Oil 2 | Stable | Stable | Stable |
| 4.2 | Oil 3 | Stable | Stable | 30% break |
| 4.3 | Oil 4 | Stable | <1% break | <1% break |
| 4.4 | Oil 5 | Stable | Stable | 3% break |

What is claimed is:

1. A method of stimulating a hydrocarbon well which has a bore leading to a hydrocarbon bearing formation, which method includes the steps of:

a) introducing into the bore a fluid including a continuous phase of or including at least one compound of the following formula (I):

$$(R^2)_p-Ph-(CH_2)_m-COO-(AO)_n-R^1 \qquad (I)$$

where
   $R^1$ is a $C_1$ to $C_{20}$ hydrocarbyl group;
   AO is an alkyleneoxy group and may vary along the (poly)alkyleneoxy chain;

n 0 or from 1 to 100;
   m is 0, 1 or 2; and
   Ph is a phenyl group, which may be substituted with groups $(R^2)p$; where each $R^2$ is independently a $C_1$ to $C_4$ alkyl or alkoxy group; and p is 0, 1 or 2;
   and at least one fatty acid ester; and b) thereafter carrying out well stimulation operations.

2. A method as claimed in claim 1 wherein $R^1$ is a $C_3$ to $C_{18}$ alkyl or alkenyl group.

3. A method as claimed in claim 1 wherein n is 0, m is 0 and p is 0.

4. A method as claimed in claim 1, wherein the fluid includes iso-propyl benzoate, iso-stearyl benzoate and/or oleyl benzoate.

5. A method as claimed in claim 1, wherein the fluid includes at least 10% by weight of the total fluid of a compound of the formula (I).

6. A fracturing fluid which is an emulsion of an aqueous medium in a continuous non-aqueous phase including at least one compound of the following formula (I):

$$(R^2)_p-Ph-(CH_2)_m-COO-(AO)_n-R^1 \qquad (I)$$

wherein
$R^1$ represents a $C_1$ to $C_{20}$ hydrocarbyl group;
AO independently represents an alkyleneoxy group;
n 0 or from 1 to 100;
m is 0, 1 or 2; and
Ph represents a phenyl group; and
$R^2$ independently represents a $C_1$ to $C_4$ alkyl or alkoxy group; and
p is 0, 1 or 2;
the fluid additionally including a dispersion of solid proppant particles.

7. A method of stimulating a hydrocarbon well which has a bore leading to a hydrocarbon bearing formation, comprising:

a) introducing into the bore a fluid comprising a compound represented by the following formula (I):

$$(R^2)_p-Ph-(CH_2)_m-COO-(AO)_n-R^1 \qquad (I)$$

wherein
   $R^1$ represents a $C_1$ to $C_{20}$ hydrocarbyl group;
   AO independently represents an alkyleneoxy group;
   n is 0 or from 1 to 100;
   m is 0, 1 or 2;
   Ph represents a phenyl group;
   $R^2$ independently represents a $C_1$ to $C_4$ alkyl or alkoxy group; and
   p is 0, 1 or 2; and b) carrying out well stimulation operations comprising acidisation and/or fracturing.

8. A method as claimed in claim 7 wherein $R^1$ represents a $C_3$ to $C_{18}$ alkyl or alkenyl group.

9. A method as claimed in claim 7 wherein n is 0, m is 0 and p is 0.

10. A method as claimed in claim 7, wherein the fluid comprises iso-propyl benzoate, iso-stearyl benzoate and/or oleyl benzoate.

11. A method as claimed in claim 7, wherein the fluid comprises at least 10% by weight of the total fluid of a compound of the formula (I).

12. A method as claimed in claim 7, wherein the fluid comprises a blend of at least one compound of the formula (I) and at least one fatty acid ester.

13. A method as claimed in claim 7 in which the well is an oil and/or gas well.

14. A method as claimed in claim 7 in which the well comprises oil and/or gas.

15. A method of acidisation of a hydrocarbon well which has a bore leading to a hydrocarbon bearing formation, which method includes the steps of:

a) introducing to a production zone of the well an acidisation fluid, said acidisation fluid comprising an emulsion of an aqueous solution of at least one acidising material in a continuous phase of an ester containing liquid including at least one compound represented by the following formula (I):

$$(R^2)_p\text{—Ph—}(CH_2)_m\text{—COO—}(AO)_n\text{—}R^1 \qquad (I)$$

wherein $R^1$ represents a $C_1$ to $C_{20}$ hydrocarbyl group;

AO independently represents an alkyleneoxy group;

n is 0 or from 1 to 100;

m is 0, 1 or 2; and

Ph represents a phenyl group, $R^2$ independently represents a $C_1$ to $C_4$ alkyl or alkoxy group; and p is 0, 1 or 2; and b) contacting said acidisation fluid with a production formation to acidise the formation.

16. A method as claimed in claim 15 wherein $R^1$ represents a $C_3$ to $C_{18}$ alkyl or alkenyl group.

17. A method as claimed in claim 15 wherein n is 0, m is 0 and p is 0.

18. A method as claimed in claim 15, wherein the acidisation fluid comprises iso-propyl benzoate, iso-stearyl benzoate and/or oleyl benzoate.

19. A method as claimed in claim 15, wherein the acidisation fluid comprises at least 10% by weight of the total carrier fluid of a compound of the formula (I).

20. A method as claimed in claim 15, wherein the acidisation fluid comprises a blend of at least one compound represented by formula (I) and at least one fatty acid ester.

21. A method as claimed in claim 15, wherein the well is an oil and/or gas well.

22. A method as claimed in claim 15 wherein the well comprises oil and/or gas.

23. A method of fracturing a hydrocarbon well which has a bore leading to a hydrocarbon bearing formation, which method includes the steps of:

a) introducing to a production zone of the well a fracturing fluid, which is an emulsion comprising an aqueous acid phase in a continuous phase of an ester containing liquid including at least one compound represented by the following formula (I):

$$(R^2)_p\text{—Ph—}(CH_2)_m\text{—COO—}(AO)_n\text{—}R^1 \qquad (I)$$

wherein $R^1$ represents a $C_1$ to $C_{20}$ hydrocarbyl group;

AO independently represents an alkyleneoxy group;

n is 0 or from 1 to 100;

m is 0, 1 or 2;

Ph represents a phenyl group;

$R^2$ independently represents a $C_1$ to $C_4$ alkyl or alkoxy group;

p is 0, 1 or 2;

said fluid additionally comprising a dispersion of solid proppant particles; and b) applying pressure to the fluid so as to subject the production zone to hydraulic fracturing.

24. A method as claimed in claim 23 wherein $R^1$ represents a $C_3$ to $C_{18}$ alkyl or alkenyl group.

25. A method as claimed in claim 23 wherein n is 0, m is 0 and p is 0.

26. A method as claimed in claim 23, wherein the fracturing fluid comprises iso-propyl benzoate, iso-stearyl benzoate and/or oleyl benzoate.

27. A method as claimed in claim 23, wherein the fracturing fluid comprises at least 10% by weight of the total fluid of a compound of the formula (I).

28. A method as claimed in claim 23, wherein the fracturing fluid comprises a blend of at least one compound of the formula (I) and at least one fatty acid ester.

29. A method as claimed in claim 23, wherein the well is an oil or gas well.

30. A method as claimed in claim 23 wherein the well comprises oil and/or gas.

31. An acidisation fluid which is an emulsion of an aqueous solution of at least one acidising material in a continuous non-aqueous phase including at least one compound of the following formula (I):

$$(R^2)_p\text{—Ph—}(CH_2)_m\text{—COO—}(AO)_n\text{—}R^1 \qquad (I)$$

where $R^1$ is a $C_1$ to $C_{20}$ hydrocarbyl group;

AO is an alkyleneoxy group and may vary along the (poly)alkyleneoxy chain;

n 0 or from 1 to 100:

m is 0, 1 or 2; and

Ph is a phenyl group, which may be substituted with groups $(R^2)p$; where each $R^2$ is independently a $C_1$ to $C_4$ alkyl or alkoxy group; and p is 0, 1 or 2.

* * * * *